US010512007B2

(12) United States Patent
Moe et al.

(10) Patent No.: US 10,512,007 B2
(45) Date of Patent: Dec. 17, 2019

(54) SELF CONFIGURATION AND OPTIMIZATION OF CELL NEIGHBORS IN WIRELESS TELECOMMUNICATIONS

(71) Applicant: Unwired Planet, LLC, Plano, TX (US)

(72) Inventors: Johan Moe, Mantorp (SE); Harald Kallin, Sollentuna (SE)

(73) Assignee: Unwired Planet, LLC, Plano, TX (US)

( * ) Notice: Subject to any disclaimer, the term of this patent is extended or adjusted under 35 U.S.C. 154(b) by 0 days.

(21) Appl. No.: 16/135,462

(22) Filed: Sep. 19, 2018

(65) Prior Publication Data

US 2019/0021030 A1 Jan. 17, 2019

Related U.S. Application Data

(63) Continuation of application No. 15/486,515, filed on Apr. 13, 2017, now Pat. No. 10,123,244, which is a continuation of application No. 14/817,459, filed on Aug. 4, 2015, now Pat. No. 9,661,535, which is a continuation of application No. 13/746,155, filed on
(Continued)

(51) Int. Cl.
H04W 36/00 (2009.01)
H04J 11/00 (2006.01)
H04W 16/00 (2009.01)
H04L 29/06 (2006.01)
H04W 24/08 (2009.01)
H04W 72/08 (2009.01)
(Continued)

(52) U.S. Cl.
CPC ..... *H04W 36/0083* (2013.01); *H04J 11/0093* (2013.01); *H04L 65/4076* (2013.01); *H04W 16/00* (2013.01); *H04W 24/08* (2013.01); *H04W 36/0061* (2013.01); *H04W 72/085* (2013.01); *H04W 36/08* (2013.01); *H04W 88/02* (2013.01)

(58) Field of Classification Search
CPC . H04J 11/0093; H04L 65/4076; H04W 16/00; H04W 24/08; H04W 36/0061; H04W 36/0083; H04W 36/08; H04W 72/085; H04W 88/02; H04W 24/02; H04W 48/08; H04W 84/045; H04W 24/04
See application file for complete search history.

(56) References Cited

U.S. PATENT DOCUMENTS 5,949,771 A 9/1999 De Clerck et al.
6,023,625 A 2/2000 Myers, Jr.
(Continued)

FOREIGN PATENT DOCUMENTS

CN 1191059 8/1998
CN 1857021 11/2006
(Continued)

OTHER PUBLICATIONS

Canadian Office Action dated Sep. 14, 2018 in CA application 2,911,987.
(Continued)

*Primary Examiner* — Ronald Eisner
(74) *Attorney, Agent, or Firm* — Nixon & Vanderhye P.C.

(57) ABSTRACT

A mobile terminal assists in the updating of a neighbor cell list associated with a first cell of a wireless telecommunications network. The list comprises elements that identify other cells that have a neighbor cell relationship with the first cell. The mobile terminal comprises a radio transceiver; and a controller coupled to the radio transceiver.

18 Claims, 4 Drawing Sheets

Related U.S. Application Data

Jan. 21, 2013, now Pat. No. 9,432,889, which is a continuation of application No. 13/483,510, filed on May 30, 2012, now abandoned, which is a continuation of application No. 13/084,884, filed on Apr. 12, 2011, now Pat. No. 8,213,941, which is a continuation of application No. 11/773,752, filed on Jul. 5, 2007, now Pat. No. 7,957,743.

(51) Int. Cl.
  *H04W 36/08* (2009.01)
  *H04W 88/02* (2009.01)

(56) References Cited

U.S. PATENT DOCUMENTS

| | | | |
|---|---|---|---|
| 6,044,272 A | 3/2000 | Kobylinski et al. | |
| 6,285,874 B1 | 9/2001 | Magnusson et al. | |
| 6,449,482 B1 | 9/2002 | Johansson et al. | |
| 6,556,829 B1 | 4/2003 | Persson | |
| 6,628,632 B1 | 9/2003 | Dolan | |
| 7,336,812 B2 | 2/2008 | Khankhel | |
| 7,701,899 B2 | 4/2010 | Jansson | |
| 7,957,743 B2 | 6/2011 | Moe et al. | |
| 8,213,941 B2 | 7/2012 | Moe et al. | |
| 8,559,952 B2 | 10/2013 | Frenger et al. | |
| 8,588,759 B2 | 11/2013 | Moe et al. | |
| 2002/0071403 A1* | 6/2002 | Crowe | H04W 36/18 370/331 |
| 2003/0112821 A1 | 6/2003 | Cleveland et al. | |
| 2004/0063428 A1* | 4/2004 | Jansson | H04W 48/12 455/434 |
| 2005/0009528 A1 | 1/2005 | Iwamura et al. | |
| 2005/0265279 A1 | 12/2005 | Markovic et al. | |
| 2005/0266853 A1 | 12/2005 | Gallagher | |
| 2006/0002355 A1 | 1/2006 | Baek et al. | |
| 2006/0002365 A1 | 1/2006 | Heino et al. | |
| 2006/0040700 A1 | 2/2006 | Roberts et al. | |
| 2006/0056351 A1 | 3/2006 | Wall | |
| 2006/0189316 A1 | 8/2006 | Kobylinski | |
| 2006/0234713 A1 | 10/2006 | Oswal et al. | |
| 2006/0240829 A1 | 10/2006 | Hurst | |
| 2007/0097938 A1 | 5/2007 | Nylander et al. | |
| 2007/0121549 A1 | 5/2007 | Yun et al. | |
| 2007/0135147 A1 | 6/2007 | De Clerck et al. | |
| 2007/0140163 A1 | 6/2007 | Meier et al. | |
| 2007/0142051 A1 | 6/2007 | Xu et al. | |
| 2007/0147377 A1 | 6/2007 | Laroia et al. | |
| 2007/0213086 A1 | 9/2007 | Chaussen et al. | |
| 2007/0291770 A1 | 12/2007 | Kitazoe | |
| 2008/0159236 A1 | 7/2008 | Ch'ng et al. | |
| 2008/0207207 A1 | 8/2008 | Moe et al. | |
| 2009/0209261 A1 | 8/2009 | Kuri et al. | |
| 2009/0275319 A1 | 11/2009 | Aoyama et al. | |
| 2011/0188473 A1 | 8/2011 | Moe et al. | |
| 2012/0014309 A1 | 1/2012 | Iizuka et al. | |
| 2012/0082135 A1 | 4/2012 | Palenius et al. | |
| 2012/0302235 A1 | 11/2012 | Moe et al. | |
| 2013/0267233 A1 | 10/2013 | Moe et al. | |

FOREIGN PATENT DOCUMENTS

| | | |
|---|---|---|
| EP | 1 720 373 A1 | 11/2006 |
| GB | 2 331 892 A | 6/1999 |
| JP | 2003-188806 A | 7/2003 |
| JP | 2004-120622 A | 4/2004 |
| JP | 5448211 B2 | 1/2014 |
| WO | 96/38014 A1 | 11/1996 |
| WO | 99/17571 A1 | 4/1999 |
| WO | 99/27736 A1 | 6/1999 |
| WO | 02/43430 A1 | 5/2002 |
| WO | 2005/032190 A1 | 4/2005 |
| WO | 2005/101890 A1 | 10/2005 |
| WO | 2006/105618 A1 | 10/2006 |
| WO | 2006113051 | 10/2006 |
| WO | 2007/010304 A1 | 1/2007 |
| WO | 2007/015529 A1 | 2/2007 |
| WO | 2007/020997 A1 | 2/2007 |

OTHER PUBLICATIONS

Notice of Allowance dated Jan. 18, 2017 in U.S. Appl. No. 14/817,459.
Summons to attend oral proceedings pursuant to Rule 115(1) EPC dated Mar. 23, 2017 in EP Application 07711716.6.
Preliminary Opinion dated Mar. 23, 2017 in EP Application 07711716.6.
R2-070674, 3GPP TSG-RAN WG2 Meeting #57, Samsung, "Transmission of time critical system information", St. Louis, USA, Feb. 12-16, 2007.
3GPP TS 25.331 v3.6.0, Technical Specification; $3^{rd}$ Generation Partnership Project; Technical Specification Group Radio Access Network; RRC Protocol Specification (Release (1999) (Mar. 2001).
ETSI TS 25.331 v7.3.0, Technical Specification; Universal Mobile Telecommunications System (UMTS); Radio Resource Control (RRC); Protocol Specification (3GPP TS 25.331 version 7.3.0 Release 7) (Dec. 2006).
R2-061987, 3GPP TSG RAN WG2#Ad Hoc on LTE, LG Electronics Inc., "Neighbouring Cell Organisation", Cannes, France, Jun. 27-30, 2006.
R2-070200, 3GPP TSG RAN WG2 #57, LG Electronics Inc., "Reduction of Size of Neighbouring Cell List", Sorrento, Italy, Jan. 15-19, 2007.
R2-062230, 3GPP TSG RAN WG2 #54, Lucent Technologies, T-Mobile, "Discussion on Auto-configuration and Dynamic Optimization", Tallinn, Estonia, Aug. 28-Sep. 1, 2006.
R2-070087, 3GPP TSG RAN WG2 #56bis, Panasonic, "Necessity of Neighbour Cell List", Jan. 15-19, 2006, Sorrento, Italy.
R2-061971, TSG-RAN Working Group 2 #53bis, NEC, "Traffic Volume Measurement and Activity Level Control", Cannes, France, Jun. 27-30, 2006.
TEMS Training Presentation, Jakarta, Dec. 18, 2006.
ETSI TS 100 908 V8.11.0, Technical Specification, Digital Cellular Telecommunications System (Phase 2+); Multiplexing and Multiple Access on the Radio Path (3GPP TS 05.02 version 8.11.0 Release 1999) (Jun. 2003).
ETSI TS 125 213 V6.5.0, Technical Specification, Universal Mobile Telecommunications System (UMTS); Spreading and Modulation (FDD) (3GPP TS 25.213 Version 6.5.0 Release 6) (Mar. 2006).
ETSI TS 125 214 V6.11.0, Technical Specification, Universal Mobile Telecommunications System (UMTS); Physical Layer Procedures (FDD) (3GPP TS 25.214 Version 6.11.0 Release 6) (Dec. 2006).
ETSI TS 125 331 V3.5.0, Technical Specification, Universal Mobile Telecommunications System (UMTS); RRC Protocol Specification 3GPP TS 25.331 Version 3.5.0 Release 1999) (Dec. 2000).
TS GR2#8(99)e62, TSG-RAN Working Group 2 (Radio layer 2 and Radio layer 3), Document D11, Ericsson, Additional Measurements in RRC Measurement Messages, Cheju, Korea.
ETSI TS 125 331 V5.19.0, Technical Specification, Universal Mobile Telecommunications System (UMTS); Radio Resource Control (RRC); Protocol Specification (3GPP TS 25.331 Version 5.19.0 Release 5). (Dec. 2006).
ETSI TS 125.401 V3.3.0, Technical Specification, Universal Mobile Telecommunications System (UMTS); UTRAN Overall Description (3G TS 25.401 Version 3.3.0 Release 1999) (Jun. 2000).
Tdoc R2-010593, 3GPP TSG-RAN-WG2 Meeting #19, Change Request, "Measurement Related Corrections", Sophia Antipolis, France, Feb. 19-23, 2001, CR p. 1-CR p. 3.
3GPP TS 25.212 version 6.10.0 Release 6, ETSI TS 125 212 V6.10.0 (Dec. 2006), p. 49.
R2-001768, 3GPP-RAN-WG2 Meeting #15, Change Request, "Cell Identity", Sophia Antipolis, France, Aug. 21-25, 2000; cover page and page with section 8.5.7.7x.
EP Communication dated Jul. 6, 2015 is EP Application 07711716.6.
Betten & Resch Jun. 26, 2015 letter re EP2119287 (85 pages).

(56) References Cited

OTHER PUBLICATIONS

Gustås et al, "Real-Time Performance Monitoring and Optimization of Cellular Systems", Ericsson Review No. 1, 2002.
3G TS 25.331 V3.3.0 Technical Specification, 3rd Generation Partnership Project; Technical Specification Group Radio Access Network; RRC Protocol Specification (Release 1999) (Jun. 2000).
3G TS 25.331 V3.4.0 Technical Specification, 3rd Generation Partnership Project; Technical Specification Group Radio Access Network; RRC Protocol Specification (Release 1999) (Sep. 2000).
ETSI TS 125 331 V3.4.1 Technical Specification, Universal Mobile Telecommunications System (UMTS); RRC Protocol Specification (3GPP TS 25.331 version 3.4.1 Release 1999) (Sep. 2000).
3GPP TS 36.300 V0.5.0 Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) (Feb. 2007).
ETSI TR 125 933 V5.4.0 Technical Report; Universal Mobile Telecommunications System (UMTS); IP Transport in UTRAN (3GPP TR 25.933 version 5.4.0 Release 5) (Dec. 2003).
ETSI TS 125 133 V7.5.0 Technical Specification; Universal Mobile Telecommunications System (UMTS); Requirements for Support of Radio Resource Management (FDD) (3GPP TS 25.133 version 7.5.0 Release 7) (Oct. 2006).
RP-030375 Overview of 3GPP Release 5—Summary of all Release 5 Features—Version 0.10, Jun. 4-6, 2003.
IEEE Standard 802.15.3™-2003, IEEE Standard for Information Technology—Telecommunications and Information Exchange Between systems—Local and Metropolitan Area Networks—Specific Requirements; Part 15.3: Wireless Medium Access Control (MAC) and Physcial Layer (PHY) Specifications for High Rate Wireless Personal Area Networks (WPANs).
R3-061737, 3GPP TSG RAN WG3 meeting #54, T-Mobile, "Self Configuration & Self Optimization Use Cases", Nov. 6-11, 2006, Riga, Latvia.
R3-061758, 3GPP TSG-RAN WG3 Meeting #54, Nokia, "Self-Configuration and Self-Optimization of Neighbor Cell Lists", Riga, Latvia, Nov. 6-10, 2006.
TSGR3#54(11) R3-070322, TSG-RAN Working Group 3 meeting #54, MCC, "Final report of 3GPP TSG RAN WG3 meeting 54", Riga, Latvia, Nov. 6-10, 2006.
S5-070207, 3GPP TSG-SA5 (Telecom Management) Meeting SA5#51, T-Mobile, "Self Configuration & Self Optimization Use Cases", Jan. 22-26, 2007, Seville, ES.
S5-061651, TSG#33(06)0753, Technical Specification Group Services and System Aspects, Meeting #34, SA5 (Telecom Management), "WID Study of Management for LTE and SAE", Dec. 4-7, 2006, Budapest, Hungary.
Shim et al, "Low Latency Handoff for Wireless IP QOS with NeighborCasting", IEEE International Conference on Communications, ICC 2002, vol. 5, 2002, pp. 3245-3249.
3GPP TSG RAN WG2 #54, R2-062174, NTT DoCoMo, Inc., "Standardisation Policy for Plug and Play RAN", Tallinn, Estoria, Aug. 28-Sep. 1, 2006.
3GPP TSG RAN WG2 Meeting #54, R2-062156, Motorola, T-Mobile, "Measurements for Network Optimization", Tallinn, Estoria, Aug. 28-Sep. 1, 2006.
3GPP TSG RAN WG2#53, R2-061545, T-Mobile, KPN, "Complexity Minimisation to Setup and Optimise an LTE Network", Shanghai, China, May 8-12, 2006.
3GPP TSG RAN WG2#53, R2-062303, Qualcomm Europe, "Discovery of Neighbour Cells in E-UTRAN", Tallinn, Estoria, Aug. 28-Sep. 1, 2006.
3GPP TSG RAN WG3#53bis, R3-061488, T-Mobile, "Impact of Self-Configuration and Self-Optimisation Functionality on Architecture & Interfaces", Seoul, South Korea, Oct. 10-13, 2006.
3GPP TSG RAN WG2#56, R2-063076, Nokia, "Control of UE Measurements for Network Self-configuration and Optimization", Riga, Latvia, Nov. 6-10, 2006.
3GPP TSG RAN WG2#54, T-Mobile, "Support for Self-Configuration and Self-Optimisation Proposal for Stage2", Tallinn, Estoria, Aug. 28-Sep. 1, 2006.
3GPP TR 25.814 V7.1.0, Technical Specification Group Radio Access Network; Physical layer aspects for evolved Universal Terrestrial Radio Access (UTRA) (Release 7) (Sep. 2006).
3GPP TSG-S1 #6, S1-(99)906, "Concept Proposal for EGPRS-136",y Sophia Antipolis France, Nov. 22-26, 1999.
Canadian Intellectual Property Office, "Office Action," issued in connection with Canadian Patent Application No. 2,593,524, dated May 20, 2014.
Canadian Intellectual Property Office, "Office Action," issued in connection with Canadian Patent Application No. 2,593,524, dated Sep. 25, 2014.
State Intellectual Property Office, P.R. China, "First Office Action," issued in connection with Chinese Patent Application No. 201310190069.0, dated Jun. 19, 2015.
EP Submission in Opposition Proceedings mailed Aug. 19, 2015 in EP Application 12159399.0.
Wang, "A Dynamic Resource Allocation for Vertical Handoff on Heterogeneous Wireless Networks", Thesis for the Degree of Master, Chaoyang University of Technology, Department of Information Management, Jun. 16, 2003.
R2-070403 3GPP TS 36.300 V0.4.0 "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" (Jan. 2007).
Exam Report issued in Opposition Proceedings on EP patent EP2119287 (App. No. 07711716.6), dated Dec. 23, 2015.
Exam Report issued in Opposition Proceedings on EP patent EP2485514 (App. No. 12159399.0), dated Feb. 15, 2016.
3GPP-RAN-WG2 Meeting #4, R2-001416, Change Request, Paris, France Jul. 3-7, 2000.
Samsung Judgment in Germany for European patent EP2119287 (Decision 4b O 122.14), dated Jan. 19, 2016.
Samsung Judgment in Germany for European patent EP2485514 (Decision 4b O 123.14), dated Jan. 19, 2016.
Samsung/Huawei Judgment in the UK for European patents EP2119287 and EP2485514, dated Jan. 29, 2016.
Office Action dated May 20, 2010 in U.S. Appl. No. 11/773,752.
Final Office Action dated Oct. 5, 2010 in U.S. Appl. No. 11/773,752.
Advisory Action dated Dec. 28, 2010 in U.S. Appl. No. 11/773,752.
Notice of Allowance dated Mar. 21, 2011 in U.S. Appl. No. 11/773,752.
Office Action dated Sep. 6, 2011 in U.S. Appl. No. 13/084,884.
Final Office Action dated Feb. 3, 2012 in U.S. Appl. No. 13/084,884.
Notice of Allowance dated Apr. 19, 2012 in U.S. Appl. No. 13/084,884.
Office Action dated Sep. 24, 2012 in U.S. Appl. No. 13/483,510.
Office Action dated Jan. 2, 2014 in U.S. Appl. No. 13/746,155.
Final Office Action dated Jul. 18, 2014 in U.S. Appl. No. 13/746,155.
Notice of Allowance dated Jan. 7, 2015 in U.S. Appl. No. 13/746,155.
Notice of Allowance dated Apr. 24, 2015 in U.S. Appl. No. 13/746,155.
Office Action dated Oct. 28, 2015 in U.S. Appl. No. 13/746,155.
Notice of Allowance dated Apr. 12, 2016 in U.S. Appl. No. 13/746,155.
European Search Report dated Feb. 13, 2018 in EP Application No. 13192588.5.
ETSI TS 134 123-1 V3.0.0, Technical Specification, Universal Mobile Telecommunications System (UMTS); User Equipment (UE) conformance specification; Part 1: Protocol conformance specification (3G TS 34.123-1 version 3.0.0 Release 1999) (Jun. 2000), pp. 418-448, 34 pages.
EP Decision revoking the European Patent (Art. 101(2) and 101(d)(b) (EPC) mailed Jan. 3, 2018 in EP application 07711716.6.
EP Minutes of the oral proceedings before the Opposition Dvision mailed Jan. 3, 2018 in EP Application 07711716.6.
EP2 Opposition 2 485 514, Auxiliary Request 5 (marked-up copy), Applicant: Unwired Planet International Limited, dated Nov. 28, 2017.

(56) References Cited

OTHER PUBLICATIONS

EP2 Opposition 2 485 514, Huawei Submission, DOC005 dated Nov. 24, 2017.
EP2 Opposition 2 485 514, Huawei Submission, DOC006 dated Nov. 24, 2017.
EP2 Opposition 2 485 514, EP Brief Communication and Nov. 6, 2017 Opponent O2 Submission dated Nov. 10, 2017.
EP Brief Communication dated Oct. 17, 2017 in EP Application 12159399.0.
EP Brief Communication dated Oct. 19, 2017 in EP Application 07711716.6.
ETSI Anlage BDP C3a; GSM Technical Specification, GSM 03.03 Version 5.0.0, Global System for Mobile communications, "Digital cellular telecommunications system (Phase 2+), Numbering, addressing and identification", Mar. 1996.
ETSI Anlage BDP C3b; GSM Technical Specification, GSM 04.08 Version 5.3.0, Global System for Mobile communications, "Digital cellular telecommunications system (Phase 2+), Mobile radio interface layer 3 specification", Jul. 1996.
Braun HTC Submission dated Sep. 28, 2017.
Prüfer Huawei Submission to EPO responsive to Summons to Attend Oral Proceedings dated Sep. 28, 2017.
Exhibits D26a and D29-D33 for Prüfer Huawei Submission to EPO responsive to Summons to Attend Oral Proceedings dated Sep. 28, 2017.
Annex A8 for Prüfer Huawei Submission to EPO responsive to Summons to Attend Oral Proceedings dated Sep. 28, 2017.
EP Communication dated Aug. 31, 2017 in EP Application 07711716.6.
ETSI, Anlage BDP C3a, GSM 03.03, Version 5.0.0, GSM Technical Specification, "Digital Cellular Telecommunications System (Phase 2+); Numbering, Addressing and Identification", Mar. 1996.
ETSI, Anlage BDP C3b, GSM 04.08, Version 5.3.0, GSM Technical Specification, "Digital Cellular Telecommunications System (Phase 2+); Mobile Radio Interface Layer 3 Specification", Jul. 1996.
Indian First Examination Report dated May 25, 2017 in Indian application 3362/KOLNP/2009.
Notice of Allowance dated Mar. 14, 2017 in Canadian application 2,911,987.
Office Action dated Dec. 22, 2016 in Canadian application 2,907,254.
Summons to attend oral proceedings pursuant to Rule 115(1) EPC mailed Apr. 11, 2017 in EP Application 12159399.0.
Preliminary Opinion dated Apr. 11, 2017 in EP Application 12159399.0.
Notice of Allowance dated Jul. 5, 2018 in U.S. Appl. No. 15/486,515.
Notice of Allowance dated Feb. 28, 2018 in U.S. Appl. No. 15/486,515.
EP Provision of the minutes in accordance with Rule 124(4) (EPC) mailed Sep. 3, 2018 in EP Application 12159399.0.
EP Decision revoking the European Patent (Art. 101(2) and 101(3)(b) EPC) mailed Sep. 3, 2018 in EP Application 12159399.0.

\* cited by examiner

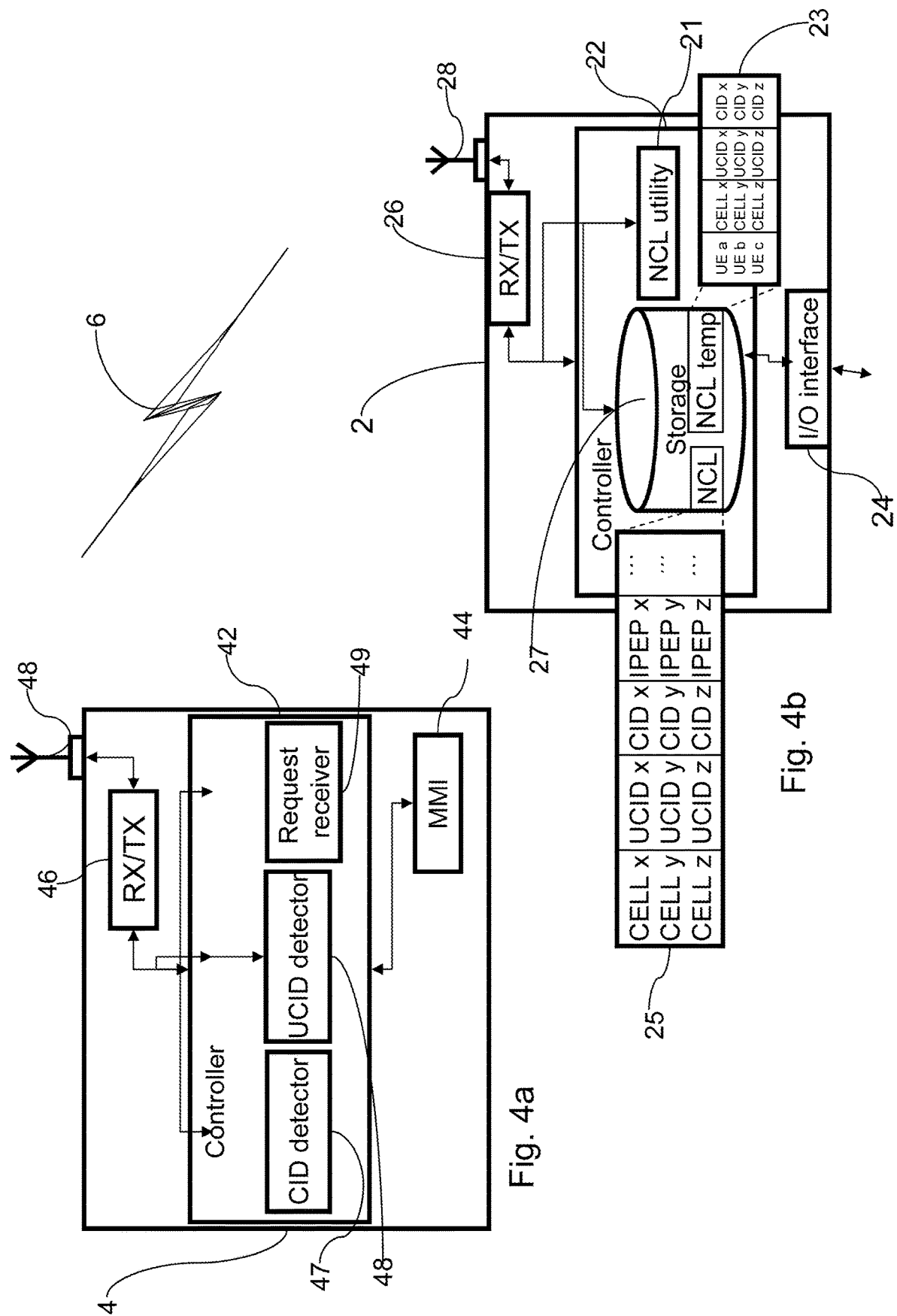

SELF CONFIGURATION AND OPTIMIZATION OF CELL NEIGHBORS IN WIRELESS TELECOMMUNICATIONS

CROSS-REFERENCE TO RELATED APPLICATIONS

This application is a continuation of U.S. application Ser. No. 15/486,515, filed Apr. 13, 2017, which is a continuation of U.S. application Ser. No. 14/817,459, filed Aug. 4, 2015 (U.S. Pat. No. 9,661,535), which is a continuation of U.S. application Ser. No. 13/746,155, filed Jan. 21, 2013 (U.S. Pat. No. 9,432,889), which is a continuation of U.S. application Ser. No. 13/483,510, filed May 30, 2012 (abandoned), which is a continuation of U.S. application Ser. No. 13/084,884, filed Apr. 12, 2011 (U.S. Pat. No. 8,213,941), which is a continuation of U.S. application Ser. No. 11/773,752, filed on Jul. 5, 2007 (U.S. Pat. No. 7,957,743), which claims the benefit of International Application No. PCT/EP2007/01737, filed Feb. 28, 2007, the disclosures of which are incorporated herein by reference.

FIELD OF INVENTION

The present invention relates to self-configuring and optimisation of cell neighbours in wireless telecommunications networks.

BACKGROUND OF THE INVENTION

FIG. 1 of the accompanying drawings illustrates a wireless telecommunications network, which support communication with terminals in a number of cells (A, B, C, D) each of which is served by a radio base station 2. Each communication cell covers a geographical area, and by combining a number of cells a wide area can be covered. A mobile terminal 4 is illustrated communicating in cell A, and is able to move around the system 1.

A base station 2 contains a number of receivers and transmitters to give radio coverage for one or more cells. Each base station 2 is connected to a network "backbone", or core network infrastructure (not shown), which enables communications between base stations and other networks. The example system of FIG. 1 shows one base station per cell.

An important concept in such a network is the cell and its neighbours. During a call a mobile terminal 4 typically is moved in the geography, and when so doing leaves a first cell and enters a new cell that neighbours the first cell. The cell may be changed several times and the process of changing the cell that supports a radio link with the terminal is called handover. A list of the known neighbours, the so called "neighbour cell set", is important both for the network 1 and for the mobile terminal 4 to enable reliable handover between cells. The network 1 can store information relating to a set of neighbour cells for each cell in the system. Evaluation of the best cell for supporting a radio link with the mobile terminal is based upon measurements made by the terminal on the serving cell and on other cells than the serving cell. The neighbour cell list is needed for mapping measurements and handover decisions to a target cell identity and possibly applying specific parameters or rules for the target cell. It will be readily appreciated that the cell boundaries are not sharply defined, but will in practice be somewhat blurred as the range of the base stations will overlap with one another.

In existing systems, the mobile terminal, 4, detects and measures cell operating parameters for neighbouring cells by measuring on their broadcast channels. One measured operating parameter is a cell non-unique identifier which typically consists of a physical layer identifier such as a scramble code which is non uniquely assigned to the cell. Operating parameters also relates to the signal quality of the neighbour cell such as signal strength, signal quality and timing information. When the quality of a neighbour cell is considered better than the current serving cell, a handover from the serving cell to the chosen neighbour cell is executed by the network. The neighbour cell then becomes the serving cell for the mobile terminal.

Typically in a WCDMA (wideband code division multiple access) system, the mobile terminal detects Common Pilot Channel (CPICH) transmissions from surrounding cells, in order to determine id (scramble code) and timing information.

When the mobile reports the neighbour cell signal quality measurements to the network, the cells' respective identities become important. Typically, cell identities are reused for more than one cell. The reuse of identities means that cells may be confused with one other, since the serving cell may have neighbouring cells sharing the same identity information.

In the cells are also broadcasted unique cell identities. The unique cell identity is carried on the network layer. Its main use is for special purpose terminals, that are used by an operator of the system for testing and tracing of problems in the network. The unique cell identity is not repeated as often as the non-unique cell identity and is more complicated for a terminal to detect. This is in contrast to the physical layer, that is physical data needed for supporting the radio link.

Since the cells' physical layer identifiers are non-unique, populating and maintaining the neighbour cell sets can never be fully automatic. Human efforts are needed to resolve conflicts where the serving cell has multiple neighbours using the same non-unique identifier. A further problem is handover failures owing to the candidate cell has been incorrectly identified.

SUMMARY OF THE PRESENT INVENTION

The aim of the present invention is to secure handovers to be performed to the right cell. It solves the problem with a method for a radio base station or for a node controlling a radio base station serving a first cell and comprises the steps of, receiving from a terminal a non-unique cell identity of a second cell and a measure on the quality of the second cell, determining if the second cell can be unambiguously identified by the information in a neighbour cell list, and if ambiguity in the second cell identity is determined, ordering the terminal to identifying and reporting on the unique second cell identity, and associating the non-unique identity with the unique identity.

In a first embodiment ambiguity on the second cell identity is identified if the non-unique cell identity is not included in the neighbour cell list. The association is then made by including the second cell non-unique cell identity and the unique cell identity in the neighbour cell list. In a second embodiment ambiguity on the second cell identity arises if two unique cell identities in the neighbour cell list have the same non-unique identity. The association with the unique cell identity with the non-unique cell identity is then made for the specific radio link with the terminal for a period. The period is typically started with the signal strength of the second cell exceeded a predefined threshold value, and ending when a handover is performed or the second cell signal strength decreases under a second threshold value.

The invention also relates to a radio base stations or a node controlling radio base stations and that is adapted for performing the method.

The invention also includes a method for mobile stations that measures the signal quality on broadcast channels in other cells than the first cell, detects the non unique cell identity on broadcast channels with a quality exceeding a threshold value, transmitting information on the signal quality and second cell non-unique identity to the serving cell and upon receiving a command, detecting the unique cell identity on a broadcast channel and transmitting the unique cell identity.

The invention further relates to a mobile station adapted for performing the method.

An advantage of the present invention is that creation and or updating of a neighbour cell list can be made automatically by the system based on the measurements and cell identity information received from the terminals. Thereby, it is not necessary for humans to plan and maintain the neighbour cell lists.

BRIEF DESCRIPTION OF THE DRAWINGS

FIG. 4a is a block diagram of a mobile terminal.

FIG. 4b is a block diagram of a base station.

DETAILED DESCRIPTION OF THE PREFERRED EMBODIMENTS

The basic problem of the present invention is to make a positive identification of a neighbouring cell that is ambiguously detected by a mobile terminal. The ambiguity may arise when a cell, not previously detected, is reported by a mobile terminal, or when two or more cells share the same non-unique cell identity and the two cells. An ambiguity will then arise on what cell that has been measured.

The problem exists in several systems, for example GSM, WCDMA and eUTRAN. In GSM and WCDMA a list of neighbour cells is created for each cell in the system by a human or at least controlled by a human. In so doing any collisions in the non-unique cell identities of the neighbours should be detected and possibly solved by reallocating the non-unique cell identities. It is cumbersome to establish and update the NCL (neighbour cell list) and the allocations of non-unique cell identities, especially when the capacity of a network is increased by the addition of further cells.

For WCDMA and eUTRAN it is desired that the NCL can, if not be completely created automatically, at least be updated automatically by the system based on measurements made by terminals on cells other than the cell serving the terminal. For that reason the present inventions is in particular important for the WCDMA and eUTRA, however, it may well be implemented also in other systems such as the GSM.

The inventions will primarily be implemented in a network node that handles the NCL and decides on handovers. In the eUTRAN this is the task of the eNodeB which is a base station, in the GSM it is the BSC (Base Station Controller) and in the WCDMA it is the RNC (Radio Network Controller) that handles the NCL. Both the BSC and the RNC have the functions of controlling the base stations and their operation on the various cells of the networks, and the term base station controller in this application refers to a node having the functions of the BSC or the RNC.

Figure 1:
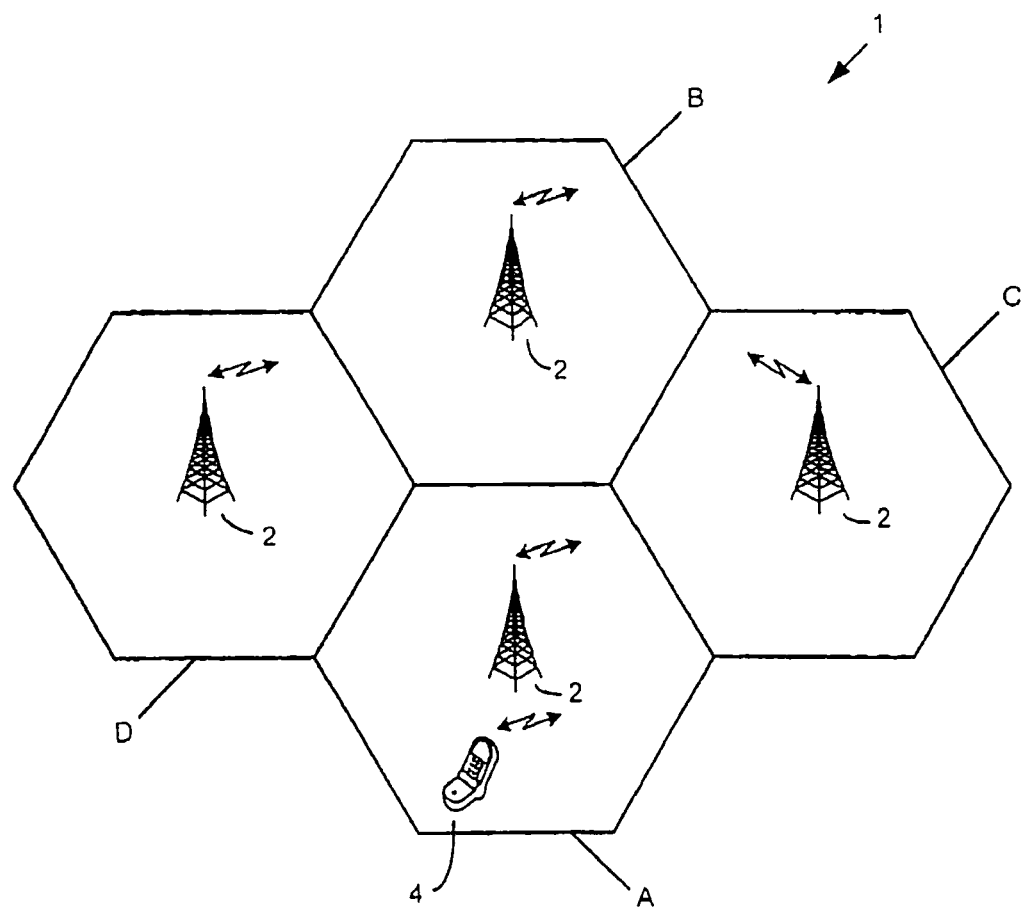
FIG. 1 illustrates a cellular wireless telecommunications network.
Figure 2:
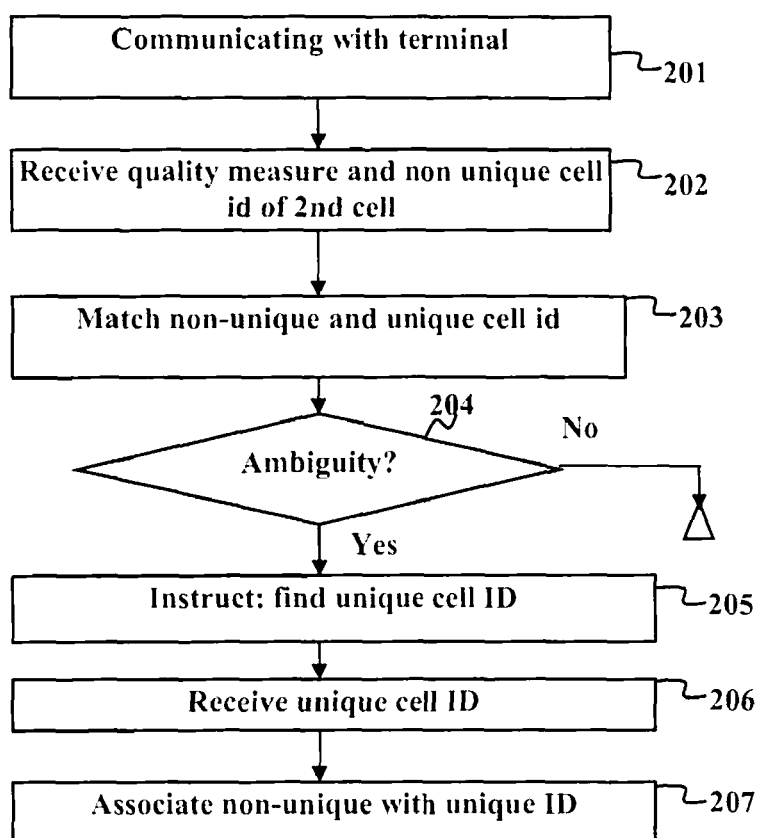
FIG. 2 illustrate steps of method for a base station or a base station controller.

FIG. 2 is a flow chart of the steps performed by a radio base station, 2, or a base station controller. For facilitating the description only the base station, 2, is mentioned when describing the method. It should be understood that the steps are alternatively carried out by the base station controller. In the first step 201 a communications link with a terminal, 4, in a first cell is supported. The base station receives; see step 202, a report from the terminal on a quality measure and a non-unique cell identity of a second cell. Next, 203, the base station retrieves the NCL to match the non-unique cell identity with a unique cell identity. If, see step 204, the match is made without any ambiguity the method is ended with respect to the second cell. If however ambiguity arises in the match, the base station instructs, 205, the terminal to detect the unique cell identity of the second cell. The base station receives the unique cell identity, 206, and in a last step, 207, the non-unique cell identity is associated with the unique cell identity within the NCL.

There are several reasons why the ambiguity may arise in the match between non-unique cell identity and the unique cell identity. The first, and basic reason is the second cell is not included in the NCL. Another reason is the NCL includes an indicator of suspected ambiguity. The indicator may have been added to the NCL prior to the method being performed. The reason may be handovers to the identified cell have failed. The failure may be detected as terminals have re-established contact with the first cell as serving cell during handover processes, or the target cell has not sent notification to the first cell as serving cell. A further reason for ambiguity is two or more unique cell identities share the same non-unique cell identity.

If the reason for the ambiguity is that the second cell with its unique and non unique cell identities is not included in the NCL they are added to it in the last associating step, 207.

The base station frequently receives, 202, reports from the terminal on measures made on other cells, and then not only the second cell. When the base station has received, 206, the second cell unique identity as detected by the terminal it shall not instruct the terminal to detect the second cell unique identity when again receiving, 202, a quality measure from the terminal, not even if the ambiguity in the NCL is maintained. Therefore, the associating step, 207, shall associate the unique cell identity with the non-unique cell identity for this particular terminal for a specific period or as long as the signal quality of the second cell exceeds a predefined threshold. The association with the particular terminal is not made in the NCL, instead a temporary NCL is used.

As long as the second cell unique cell identity is associated with the terminal, if handover to the second cell is decided it will be directed via the associated second cell unique identity. Thereby the second cell will be instructed to prepare a handover of the terminal, before the terminal itself is instructed to make a handover to the second cell.

In addition to the requirement of ambiguity in the match of unique cell identity to the non-unique cell identity, the further requirement of the second cell quality measure exceeding a threshold value can be added before the terminal is instructed to detect the second cell unique identity. The reason for adding the further requirement is to avoid expense of the terminal performing the detection. The unique cell identity is transmitted from base stations at a much less frequent interval than the physical layer identity. In order to receive and decode this information, the mobile terminal 4 may have to shortly interrupt its communication with the serving cell.

Moreover, some filtering of the measurement data may be needed before the second cell is added to the NCL in the associating step 207. For example the second cell is not included until it has been reported by two or more mobile terminals, thereby avoiding adding a distant cell that was detected under exceptional propagation conditions, for example from a mobile terminal 4 located in an aircraft.

Additionally in step 207, cell lookup maps the unique cell identity (UCID) to the address of the realizing node of that cell. For example, in LTE, this can be an ordinary DNS, mapping the cell identity to an IP address. The IP address in turn points to the RBS realizing the cell.

Figure 3:
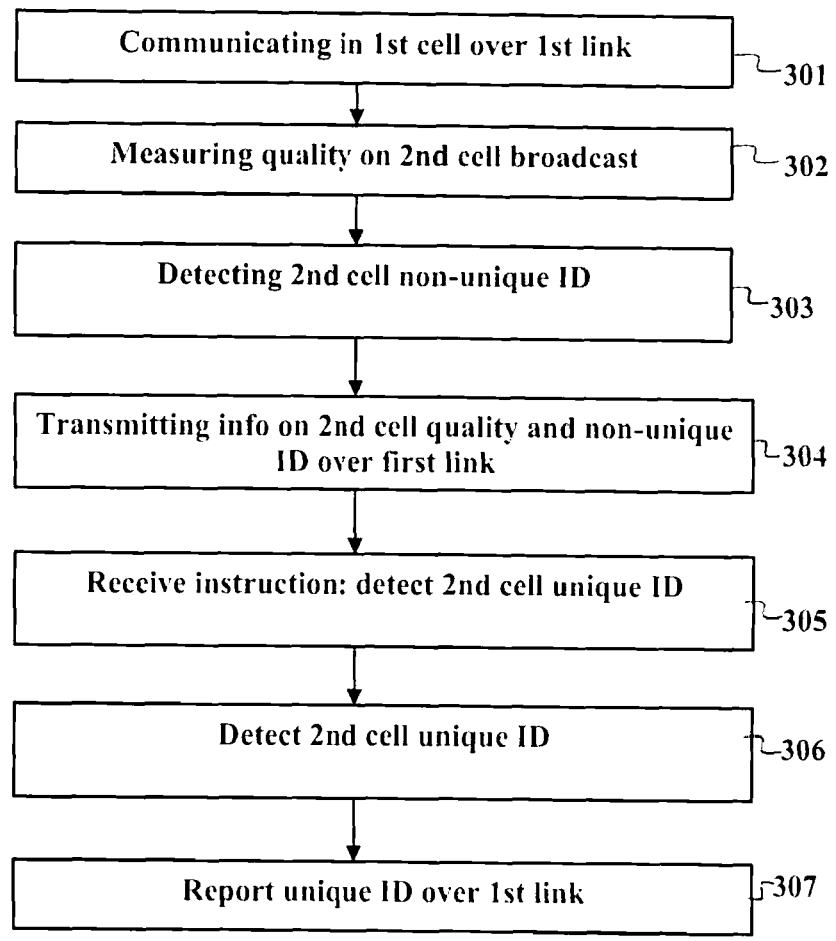
FIG. 3 illustrate steps of a method for a terminal.

FIG. 3 is a flowchart of the steps to be performed by a mobile terminal. In a first step 301, the terminal is in communication with the first cell over a first radio link. In the next step, 302, the terminal measures the quality of a broadcast channel transmitted in a second cell, and detects, 303, the second cell non-unique identity as sent on layer 1 communication. In a fourth step, 304, the terminal transmits the second cell non-unique identity, and quality measure over the first radio link. The quality measure and the non-unique identity are tied together in the transmission. In a following step, 305, the terminal receives an instruction over the first radio link to detect the second cell unique identity. Next, 306, the terminal detects the second cell unique identity as broadcasted on network layer. In the last step, 307, the terminal transmits the second cell unique identity over the first radio link.

The terminal 4 scans the spectrum to find broadcast channels of potential neighbour cells. The ability to detect and measure a broadcast channel depends on the sensitivity of the hardware in the terminal transceiver and of the broadcast channel power relative to the interference level. A further prerequisite for detecting the second cell identity of the potential neighbour cell in step 303 may be added, and that be the broadcast channel reception quality as detected in step 302, exceeds a threshold value. If the non-unique cell identity is not detected, the second cell is of course not informed to the network, in step 304.

FIG. 4a is a block diagram of parts of a mobile terminal 4 that are essential for the present invention. The mobile terminal 4 comprises a controller 42, a man machine interface (MMI) 44, a radio transceiver 46, and an antenna 50. The controller 42 of the mobile terminal 4 serves to control communications with the base station 2 via the transceiver 46 and antenna 50, over the air interface 6. This means the controller 42 has the function of receiving control messages from the base station, and controls the operation of the mobile terminal in accordance with the control messages. Data detected by the transceiver passes through controller 42. The controller reads control information on the physical layer. With respect to measures on other cells than the serving cell the controller 42 receives the measures on the reception quality and identifies the non-unique cell identity. The controller further collects and measures the associated non-unique cell identities and reports to the radio base stations regularly. The controller is equipped with a CID (cell identity) detector 47 for identifying the non-unique cell identity in the physical layer information. The terminal blocks and functioning so far described are the same as for prior art terminals 4. However, the functioning of the controller is adapted for the present invention. The controller has a request receiver 49, arranged for detecting a control message from the serving base station on identifying the unique cell identity of a cell of a non-unique cell identity. When such a request has been received, the controller 42, controls the transceiver 46 to detect data on the second cell broadcast channel, until the unique cell identity has been identified. The controller 42 is equipped with a UCID detector that reads the information on the network layer, as received from the transceiver. The controller 42 controls the transceiver to continue detecting data on the broadcast channel until the UCID detector has found the unique cell identity. Owing to the unique cell identity is repeated with long intervals, the identification of the unique cell identity requires the transceiver to detect the broadcast channel for a longer time than if just the non-unique identity need be detected.

The CID detector 47, the UCID detector 48, and the request receiver 49 are preferably implemented as SW modules, however, they may alternatively be implemented in hardware or in a combination of the two.

Interactions with the user of the device take place using the man machine interface 44, which can include a key pad, microphone, loudspeaker and display device, for example.

FIG. 4b is a block diagram of a base station 2 which communicate via an air interface 6. Only blocks essential for the present invention are disclosed. The base station 2 includes an input/output (I/O) interface 24, a radio transceiver 26 an antenna 28 and a controller 22. The controller communicates with mobile terminals via the transceiver 26 and antenna 28 over the air interface 6. The controller 22 also communicates with the rest of the telecommunications network via the I/O interface 24. For this invention the controller also includes NCL utility, 21, a storage device, 27, a temporary NCL, 23, and a NCL, 25. The controller retrieves the NCL for identifying the unique cell identifiers for the non-unique cell identifiers reported by the terminals. These aspects of the base station are designed to operate in accordance with usual practice. The NCL unit monitors if the match between non-unique and unique cell identity can be made without ambiguity. If ambiguity exist the NCL unity initiates an instruction is sent to the terminal for it to report of the unique cell identity of the non-uniquely identified cell. When the unique cell identity is reported by the terminal, the NCL utility 22 controls the unique and the non-unique cell identity are listed and associated with the terminal identity in the temporary NCL. A further condition for listing in the temporary NCL is the reported reception quality is above a first threshold level. The NCL utility 22 also controls the non-relevant association to be deleted. Typically this is made when the signal strength of a cell on the temporary NCL has decreased under a second threshold level. Alternatively the data base 27 with NCL and temporary NCL are located outside the controller and connected to it.

Typically the controller will also decide on handovers from the serving base station to a target base station serving the second cell, or which of the other cells that temporary will function as second cell.

In an alternative to the base station described with reference to FIG. 4b, the controller 22 is located in a radio network controller. The radio network controller with internal controller is then connected to at least one radio base station transceiver. The functioning of the internal controller 22 will then be the same as described in connection to the radio base station.

However, base stations 2 and mobile terminals 4 which operate in accordance with the present invention are adapted to carry out the method of the invention as described below with reference to FIGS. 3 to 6. It will be appreciated that the various functional units can be provided by the controller 42, 22, or by other specific units in the devices, or network 1.

Making use of unique cell identifiers (UCID) means that there is unambiguous information relating to the identity of the neighbour cells, and so confusion regarding those neighbouring cells is removed. Using the fast and low-resource demanding non-unique cell identity for most of the measurements, facilitates efficient resource usage within mobile terminals 4 and rapid handover to the neighbour cells. The mobile terminal 4 is only requested to retrieve the more cumbersome unique cell identifier when a new neighbour is detected, or when an audit of the relation between the non-unique and unique cell identity seems appropriate.

All cell relations can be continuously evaluated. Inputs to that evaluation are mobile terminal reports and events, network events and operator input. The result of the evaluation is that the cell or cell relations will retain different properties. This can also be seen as the cell relation being in different states.

The major advantage of embodiments of the present invention is that it removes the need for manual involvement within the process of maintaining neighbour sets. The operator can decide to fully neglect the concept of neighbours and let the system take care of the neighbour cell definitions.

The invention claimed is:

1. A method for operating a mobile terminal in a wireless telecommunications network which comprises a plurality of communications cells, in each of which a non-unique cell identity and a unique cell identity are transmitted, the network storing a neighbour cell set, the neighbour cell set comprising known neighbours of a first communication cell, the method comprising:
    communicating with a radio base station which serves the first communications cell;
    determining the non-unique cell identity of a second communications cell based on control information received on a first channel;
    reporting the non-unique cell identity of the second communications cell to the radio base station that serves the first communications cell;
    subsequent to determining and reporting the non-unique cell identity of the second communications cell to the radio base station that serves the first communications cell, receiving a request from the radio base station to also retrieve, based on the second communications cell not being included in the neighbour cell set of the first communications cell, the unique cell identity of the second communications cell among the plurality of communications cells;
    retrieving the unique cell identity of the second communications cell on a second channel; and
    reporting the unique cell identity of the second communications cell to the radio base station of the first communications cell.

2. The method of claim 1, wherein the non-unique cell identity of the second communications cell as being reported has tied to it at least one operating parameter of the second communications cell, the at least one operating parameter comprising one or more of a signal strength measurement, a signal quality measurement, and timing information.

3. The method of claim 1, wherein retrieving and reporting the unique cell identity is performed in response to receiving the request from the radio base station of the first communications cell.

4. The method of claim 1, wherein the second communications cell neighbours the first communications cell.

5. The method of claim 1, wherein the first channel is a physical layer channel.

6. The method of claim 1, wherein the second channel is a network layer channel.

7. The method of claim 1, wherein the second channel is a broadcast channel.

8. The method of claim 1, wherein the first channel is a physical layer channel and the second channel is a network layer channel.

9. The method of claim 1, wherein the first channel is a physical layer channel and the second channel is a broadcast channel.

10. A mobile terminal for use in a wireless telecommunications network which comprises a plurality of communications cells, in each of which a non-unique cell identity and a unique cell identity are transmitted, the network storing a neighbour cell set, the neighbour cell set comprising known neighbours of a first communication cell, the mobile terminal comprising a controller configured to:
    communicate with a radio base station which serves the first communications cell;
    determine the non-unique cell identity of a second communications cell based on control information received on a first channel;
    report the non-unique cell identity of the second communications cell to the radio base station that serves the first communications cell;
    subsequent to determining and reporting the non-unique cell identity of the second communications cell to the radio base station that serves the first communications cell, receive a request from the radio base station to also retrieve, based on the second communications cell not being included in the neighbour cell set of the first communications cell, the unique cell identity of the second communications cell among the plurality of communications cells;
    retrieve the unique cell identity of the second communications cell on a second channel; and
    report the unique cell identity of the second communications cell to the radio base station of the first communications cell.

11. The mobile terminal of claim 10, wherein the non-unique cell identity of the second communications cell as being reported has tied to it at least one operating parameter of the second communications cell, the at least one operating parameter comprising one or more of a signal strength measurement, a signal quality measurement, and timing information.

12. The mobile terminal of claim 10, wherein retrieving and reporting the unique cell identity is performed in response to receiving the request from the radio base station of the first communications cell.

13. The mobile terminal of claim 10, wherein the second communications cell neighbours the first communications cell.

14. The mobile terminal of claim 10, wherein the first channel is a physical layer channel.

15. The mobile terminal of claim 10, wherein the second channel is a network layer channel.

16. The mobile terminal of claim 10, wherein the second channel is a broadcast channel.

17. The mobile terminal of claim 10, wherein the first channel is a physical layer channel and the second channel is a network layer channel.

18. The mobile terminal of claim 10, wherein the first channel is a physical layer channel and the second channel is a broadcast channel.

\* \* \* \* \*